US011520417B2

United States Patent
Lu et al.

(10) Patent No.: US 11,520,417 B2
(45) Date of Patent: Dec. 6, 2022

(54) MOUSE HAVING REPLACEABLE PALM REST AND REPLACEABLE FINGER REST

(71) Applicant: DEXIN CORPORATION, New Taipei (TW)

(72) Inventors: Ho-Lung Lu, New Taipei (TW); Kuan-Ling Chen, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/356,680

(22) Filed: Jun. 24, 2021

(65) Prior Publication Data

US 2022/0308684 A1    Sep. 29, 2022

(30) Foreign Application Priority Data

Mar. 23, 2021    (TW) ................................ 110110336

(51) Int. Cl.
*G06F 3/0354* (2013.01)
*G06F 3/039* (2013.01)
*H01F 7/02* (2006.01)

(52) U.S. Cl.
CPC .......... *G06F 3/03543* (2013.01); *G06F 3/039* (2013.01); *H01F 7/02* (2013.01)

(58) Field of Classification Search
CPC ......... G06F 3/03543; G06F 3/039; H01F 7/02
See application file for complete search history.

(56) References Cited

U.S. PATENT DOCUMENTS

| | | | |
|---|---|---|---|
| 8,054,292 B1* | 11/2011 | Forde .................. | G06F 3/03543 345/163 |
| 10,969,880 B1* | 4/2021 | Lin ...................... | G06F 3/03543 |
| 2003/0214484 A1* | 11/2003 | Haywood ............. | G06F 3/0338 345/163 |
| 2005/0062716 A1* | 3/2005 | Rogers .................... | G06F 3/039 345/163 |
| 2007/0125913 A1* | 6/2007 | Miller .................. | G06F 3/03543 248/118 |
| 2008/0055251 A1* | 3/2008 | Yen ...................... | G06F 3/03543 345/163 |
| 2008/0136777 A1* | 6/2008 | Lu ............................ | G06F 3/039 345/163 |
| 2011/0063219 A1* | 3/2011 | Min-Liang .......... | G06F 3/03543 345/163 |
| 2014/0210718 A1* | 7/2014 | Wang .................. | G06F 3/03541 345/163 |
| 2015/0138093 A1* | 5/2015 | Young ................... | G06F 3/0312 345/166 |

(Continued)

*Primary Examiner* — Ariel A Balaoing
(74) *Attorney, Agent, or Firm* — Li & Cai Intellectual Property (USA) Office

(57) ABSTRACT

A mouse having a replaceable palm rest and a replaceable finger rest is provided. The mouse includes a mouse body, the replaceable finger rest, and the replaceable palm rest. The mouse body has two side portions opposite to each other and a rear side portion located between the two side portions. The replaceable finger rest is replaceably coupled to the side portions of the mouse body by magnetic attraction. The replaceable palm rest is replaceably coupled to the rear side portion of the mouse body by magnetic attraction. The replaceable palm rest presses downwardly against the replaceable finger rest when the replaceable palm rest is downwardly coupled to the rear side portion of the mouse body.

7 Claims, 8 Drawing Sheets

(56) References Cited

U.S. PATENT DOCUMENTS

| | | | |
|---|---|---|---|
| 2019/0064940 A1* | 2/2019 | Lu | G06F 3/033 |
| 2019/0163290 A1* | 5/2019 | Lu | G06F 3/03543 |
| 2020/0209989 A1* | 7/2020 | Lu | G06F 3/03543 |

* cited by examiner

MOUSE HAVING REPLACEABLE PALM REST AND REPLACEABLE FINGER REST

CROSS-REFERENCE TO RELATED PATENT APPLICATION

This application claims the benefit of priority to Taiwan Patent Application No. 110110336, filed on Mar. 23, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a computer mouse, and more particularly to a mouse having a replaceable palm rest and a replaceable finger rest.

BACKGROUND OF THE DISCLOSURE

With the recent popularization of computers, more and more mouses have been designed and improved upon for convenient operation of the computers. Therefore, some mouses on the market are configured to have a finger rest or a palm rest, so as to provide better comfort for users of the mouse. For specific groups of people (e.g., hardcore garners), different types of the finger rest are provided. To facilitate replacement, these finger rests are coupled to the mouse by magnetic attraction. However, the finger rest is not capable of achieving a firm coupling by magnetic attraction alone, thereby often causing problems for the hardcore garners.

SUMMARY OF THE DISCLOSURE

In response to the above-referenced technical inadequacy, the present disclosure provides a mouse having a replaceable palm rest and a replaceable finger rest.

In one aspect, the present disclosure provides a mouse having a replaceable palm rest and a replaceable finger rest, which includes: a mouse body having two side portions that are opposite to each other and a rear side portion that is located between the two side portions; the replaceable finger rest replaceably coupled to the side portions of the mouse body by magnetic attraction; and the replaceable palm rest replaceably coupled to the rear side portion of the mouse body by magnetic attraction. The replaceable palm rest presses downwardly against the replaceable finger rest when the replaceable palm rest is downwardly coupled to the rear side portion of the mouse body.

Preferably, the rear side portion of the mouse body is configured to include a plurality of first magnetic attraction members, and the replaceable palm rest is configured to include a plurality of second magnetic attraction members. When the replaceable palm rest is coupled to the rear side portion of the mouse body, the plurality of first magnetic attraction members are correspondingly and magnetically attached to the plurality of second magnetic attraction members.

Preferably, the rear side portion of the mouse body is configured to include two of the first magnetic attraction members, and the two of the first magnetic attraction members are located at opposite left and right sides of the rear side portion of the mouse body, respectively. The replaceable palm rest is configured to include two of the second magnetic attraction members, and the two of the second magnetic attraction members are located at opposite left and right sides of a bottom side of the replaceable palm rest, respectively.

Preferably, each of the side portions of the mouse body is configured to include a plurality of third magnetic attraction members, and the replaceable finger rest is configured to include a plurality of fourth magnetic attraction members. When the replaceable finger rest is coupled to the side portions of the mouse body, the plurality of third magnetic attraction members are correspondingly and magnetically attached to the plurality of fourth magnetic attraction members.

Preferably, each of the side portions of the mouse body is configured to include two of the third magnetic attraction members, and the two of the third magnetic attraction members are located at opposite front and rear sides of each of the side portions of the mouse body, respectively. The replaceable finger rest is configured to include two of the fourth magnetic attraction members, and the two of the fourth magnetic attraction members are located at opposite front and rear sides of an inner side of the replaceable finger rest, respectively.

Preferably, a height between a rear edge of a top surface of the replaceable palm rest and a bottom side of the mouse body is changed by replacement of the replaceable palm rest.

Preferably, the replaceable finger rest has a finger rest portion that protrudes outwardly for placement of a finger and a coupling portion that bends and extends from the finger rest portion toward the rear side portion of the mouse body, and the replaceable palm rest presses downwardly against the coupling portion of the replaceable finger rest when the replaceable palm rest is downwardly coupled to the rear side portion of the mouse body.

Preferably, a width of the finger rest portion of the replaceable finger rest extending outwardly is changed by replacement of the replaceable finger rest.

The beneficial effect of the present disclosure is that, in the mouse having the replaceable palm rest and the replaceable finger rest provided by the present disclosure, by virtue of "the replaceable finger rest being replaceably coupled to the side portions of the mouse body by magnetic attraction, the replaceable palm rest being replaceably coupled to the rear side portion of the mouse body by magnetic attraction, and the replaceable palm rest pressing downwardly against the replaceable finger rest when the replaceable palm rest is downwardly coupled to the rear side portion of the mouse body", not only can the finger rest and the palm rest be replaced in a convenient and rapid manner by magnetic attraction, but an issue regarding the finger rest not being capable of achieving a firm coupling by magnetic attraction alone can also be effectively resolved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
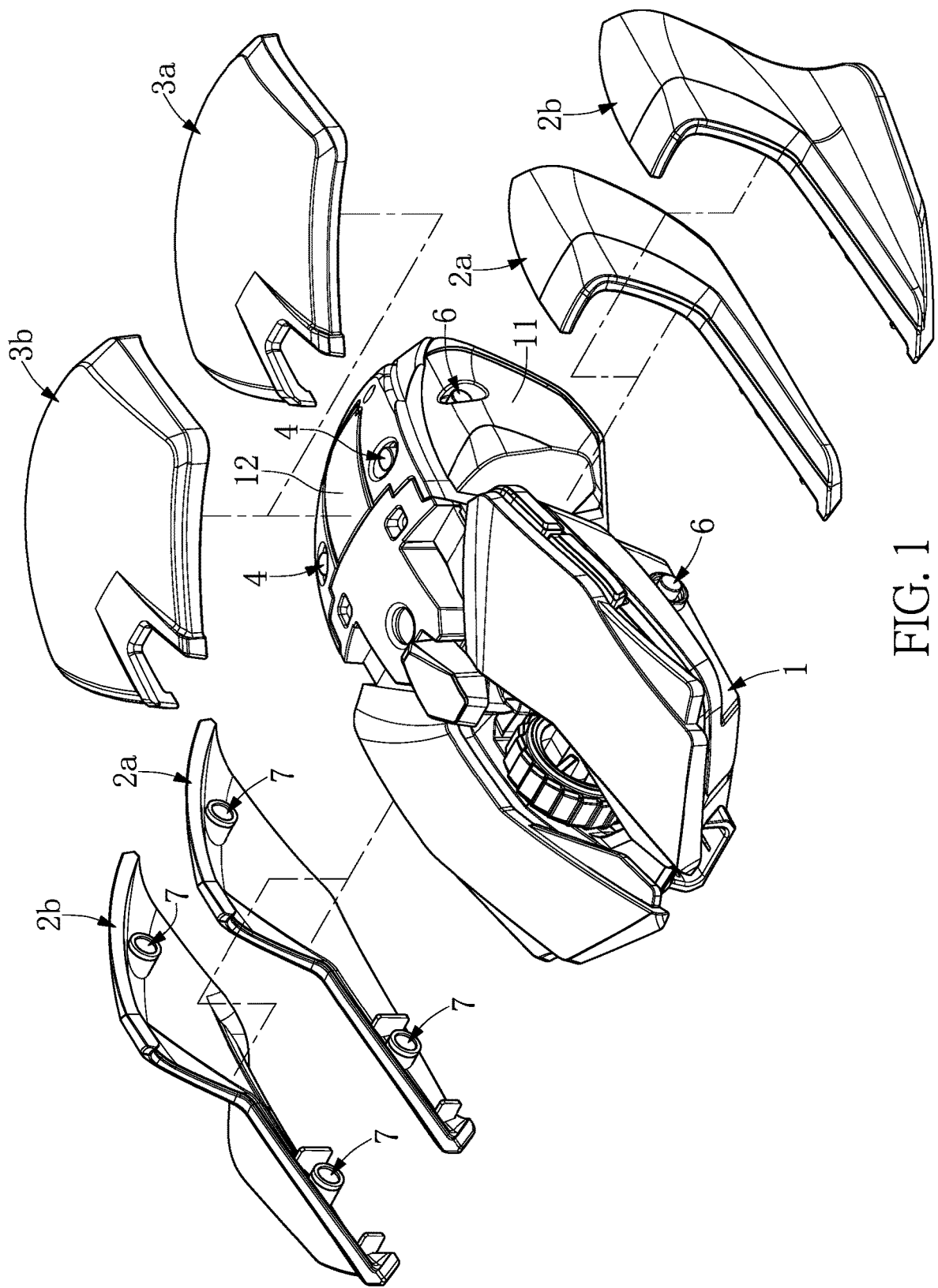
FIG. 1 is a schematic exploded view of a mouse having a replaceable palm rest and a replaceable finger rest according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
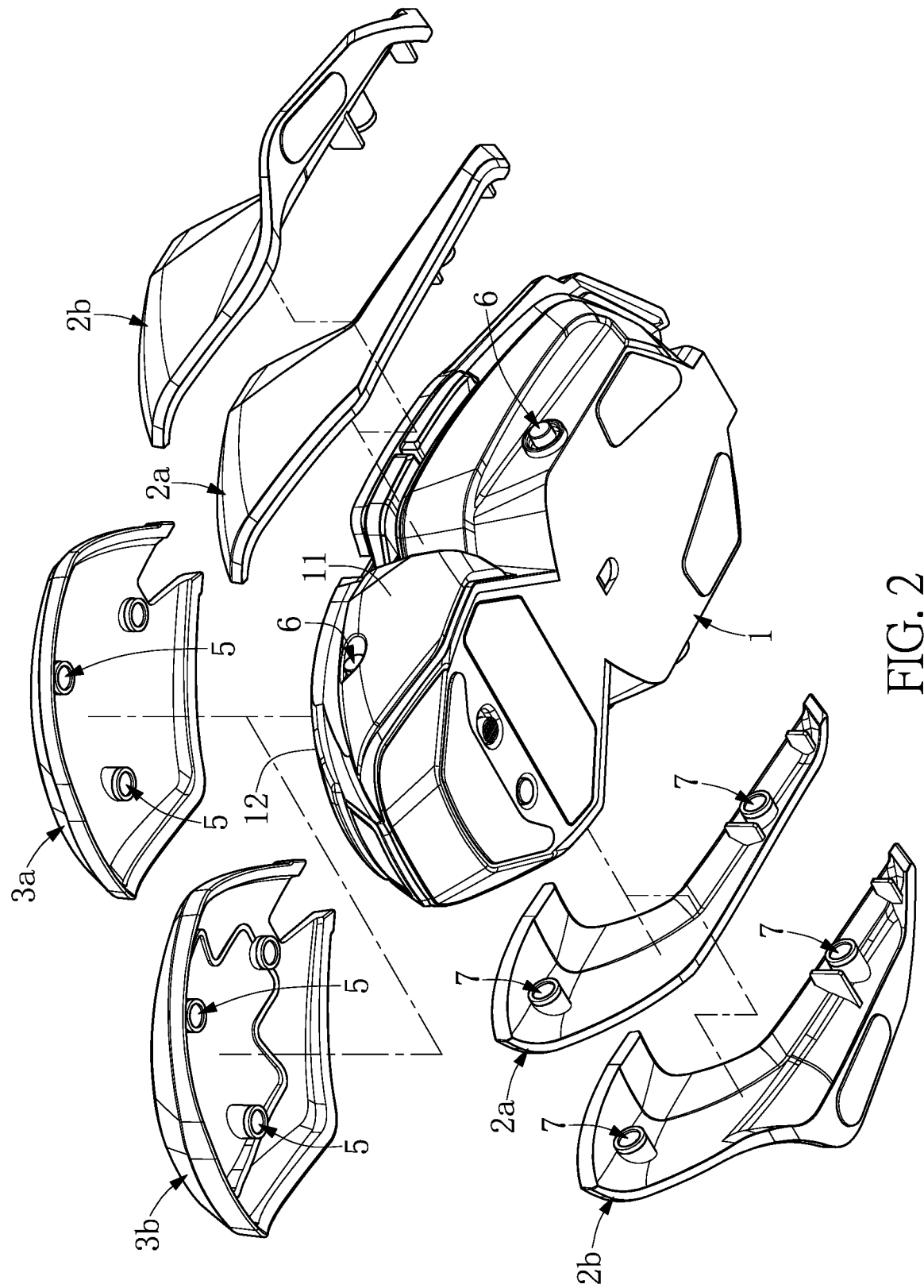
FIG. 2 is another schematic exploded view of the mouse having the replaceable palm rest and the replaceable finger rest according to the present disclosure.

Referring to FIG. 1 to FIG. 8, the present disclosure provides a mouse having a replaceable palm rest and a replaceable finger rest. As shown in FIG. 1 and FIG. 2, the mouse having the replaceable palm rest and the replaceable finger rest provided by the present disclosure basically includes a mouse body 1, a replaceable palm rest 2a, 2b, and a replaceable finger rest 3a, 3b. In the following description, structures of each component of the mouse having the replaceable palm rest and the replaceable finger rest in the present embodiment will be illustrated. Connection relationships between the components of the mouse having the replaceable palm rest and the replaceable finger rest in the present embodiment will also be described.

The mouse body 1 of the present embodiment is a mouse body that has complete functions of a mouse, and the mouse body 1 can be a wired mouse or a wireless mouse. The mouse body 1 of the present embodiment has two side portions 11 opposite to each other and a rear side portion 12 located between the two side portions 11. In addition, the mouse body 1 further includes other components, such as a scroll wheel, a switch, and a trajectory sensing module (which are common components required for the functioning of the mouse). However, these components are not technical features of the present disclosure, and will not be reiterated herein.

The replaceable finger rest 2a, 2b of the present embodiment is replaceably coupled to the side portions 11 of the mouse body 1. Specifically, the replaceable finger rest 2a, 2b of the present embodiment is replaceably coupled to the side portions 11 of the mouse body 1 by magnetic attraction. Moreover, the replaceable finger rest 2a, 2b can be replaced according to user habits.

The replaceable palm rest 3a, 3b of the present embodiment is replaceably coupled to the rear side portion 12 of the mouse body 1. Specifically, the replaceable palm rest 3a, 3b of the present embodiment is replaceably coupled to the rear side portion 12 of the mouse body 1 by magnetic attraction. Moreover, the replaceable palm rest 3a, 3b can be replaced according to the user habits. It is worth mentioning that the replaceable palm rest 3a, 3b of the present embodiment presses downwardly against the replaceable finger rest 2a, 2b when the replaceable palm rest 3a, 3b of the present embodiment is downwardly coupled to the rear side portion 12 of the mouse body 1. That is to say, through the replaceable finger rest 2a, 2b being coupled to the side portions 11 of the mouse body 1 by magnetic attraction, the replaceable palm rest 3a, 3b can then be coupled to the rear side portion 12 of the mouse body 1 by magnetic attraction and press downwardly against the replaceable finger rest 2a, 2b. Therefore, in the present disclosure, not only can the finger rest and the palm rest be replaced in a convenient and rapid manner by magnetic attraction, but an issue regarding the finger rest not being capable of achieving a firm coupling by magnetic attraction alone can also be effectively resolved.

More specifically, as shown in FIG. 1, the rear side portion 12 of the mouse body 1 of the present embodiment is configured to include a plurality of first magnetic attraction members 4. As shown in FIG. 2, the replaceable palm rest 3a, 3b is configured to include a plurality of second magnetic attraction members 5. When the replaceable palm rest 3a, 3b is coupled to the rear side portion 12 of the mouse body 1, the first magnetic attraction members 4 are correspondingly and magnetically attached to the second magnetic attraction members 5, thereby allowing the replaceable palm rest 3a, 3b to be replaceably coupled to the rear side portion 12 of the mouse body 1 by magnetic attraction.

In the present embodiment, the rear side portion 12 of the mouse body 1 is configured to include two of the first magnetic attraction members 4, and the two of the first magnetic attraction members 4 are located at opposite left and right sides of the rear side portion 12 of the mouse body 1, respectively. The replaceable palm rest 3a, 3b is configured to include two of the second magnetic attraction members 5, and the two of the second magnetic attraction members 5 are located at opposite left and right sides of a bottom side of the replaceable palm rest 3a, 3b, respectively. However, a specific quantity of the first magnetic attraction members 4 is not limited to two, and there is no limitation on where the first magnetic attraction members 4 are located at the rear side portion 12 of the mouse body 1. A specific quantity of the second magnetic attraction members 5 is not limited to two, and there is no limitation on where the second magnetic attraction members 5 are located at the bottom side of the replaceable palm rest 3a, 3b.

In the present embodiment, as shown in FIG. 1, each of the side portions 11 of the mouse body 1 is configured to include a plurality of third magnetic attraction members 6. As shown in FIG. 2, the replaceable finger rest 2a, 2b is configured to include a plurality of fourth magnetic attraction members 7. When the replaceable finger rest 2a, 2b is coupled to the side portions 11 of the mouse body 1, the third magnetic attraction members 6 are correspondingly and magnetically attached to the fourth magnetic attraction members 7, thereby allowing the replaceable finger rest 2a, 2b to be replaceably coupled to the side portions 11 of the mouse body 1 by magnetic attraction.

In the present embodiment, each of the side portions 11 of the mouse body 1 is configured to include two of the third magnetic attraction members 6, and the two of the third magnetic attraction members 6 are located at opposite front and rear sides of each of the side portions 11 of the mouse body 1, respectively. The replaceable finger rest 2a, 2b is configured to include two of the fourth magnetic attraction members 7, and the two of the fourth magnetic attraction members 7 are located at opposite front and rear sides of an inner side of the replaceable finger rest 2a, 2b, respectively. However, a specific quantity of the third magnetic attraction members 6 is not limited to two, and there is no limitation on where the third magnetic attraction members 6 are located at the side portions 11 of the mouse body 1. A specific quantity of the fourth magnetic attraction members 7 is not limited to two, and there is no limitation on where the fourth magnetic attraction members 7 are located at the inner side of the replaceable finger rest 2a, 2b.

Figure 3:
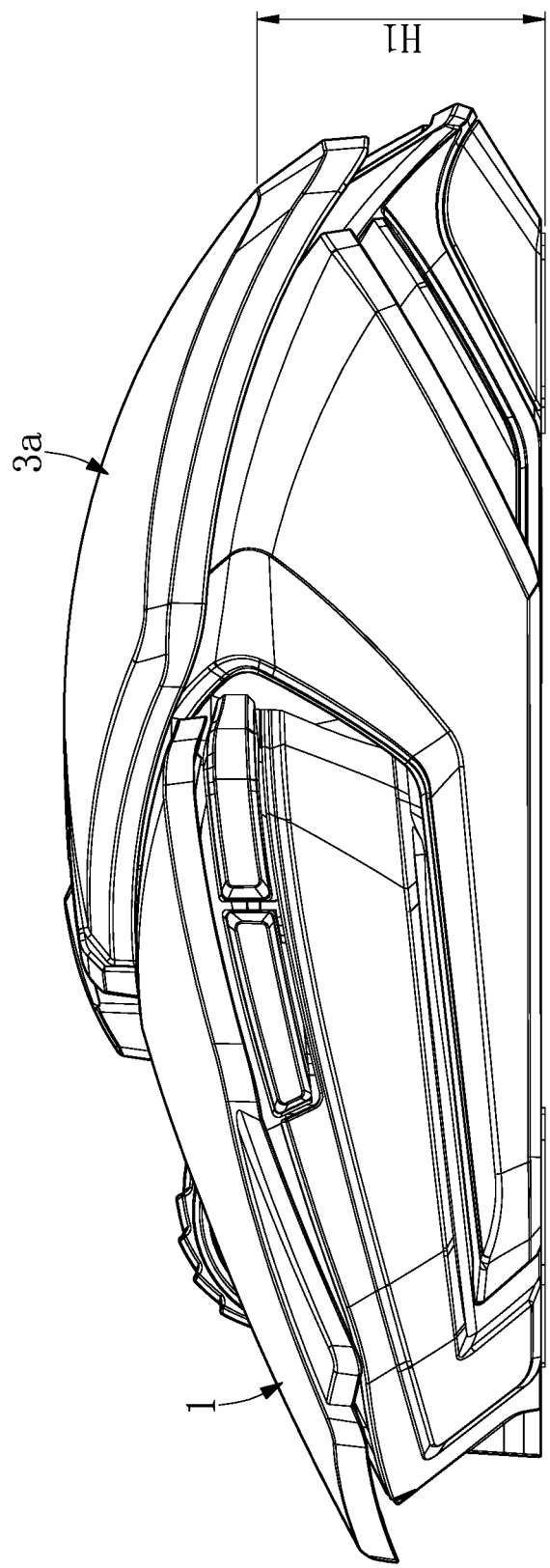
FIG. 3 is a schematic side view of the replaceable palm rest being placed on the mouse having the replaceable palm rest and the replaceable finger rest according to the present disclosure.

As shown in FIG. 3, by having the replaceable palm rest 3a placed onto the rear side portion 12 of the mouse body 1, a palm of the user can rest on the palm rest when the user uses the mouse, which allows the palm to be well supported. In addition, as shown in the figure, a first height H1 is defined between a rear edge of a top surface of the replaceable palm rest 3a and a bottom side of the mouse body 1.

Figure 4:
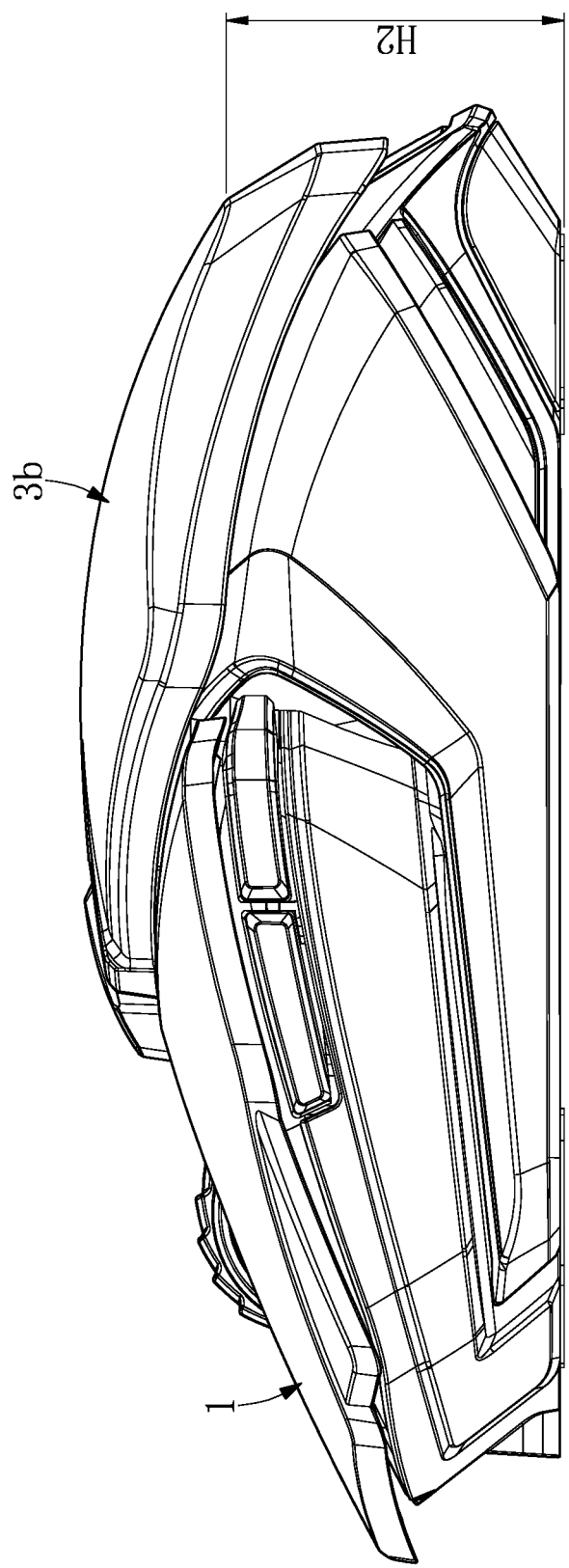
FIG. 4 is a schematic side view of a different replaceable palm rest being placed on the mouse having the replaceable palm rest and the replaceable finger rest according to the present disclosure.

As shown in FIG. 4, the replaceable palm rest 3b is placed onto the rear side portion 12 of the mouse body 1. In addition, as shown in the figure, a second height H2 is defined between a rear edge of a top surface of the replaceable palm rest 3b and the bottom side of the mouse body 1. The second height H2 is greater than the first height H1 shown in FIG. 3, which allows the palm to be lifted and rest at a higher position. In this way, the palm is better supported. Therefore, by replacing the palm rest, there is a change in height between the rear edge of the top surface of the palm rest and the bottom side of the mouse, so as to provide the palm with different degrees of support.

Figure 5:
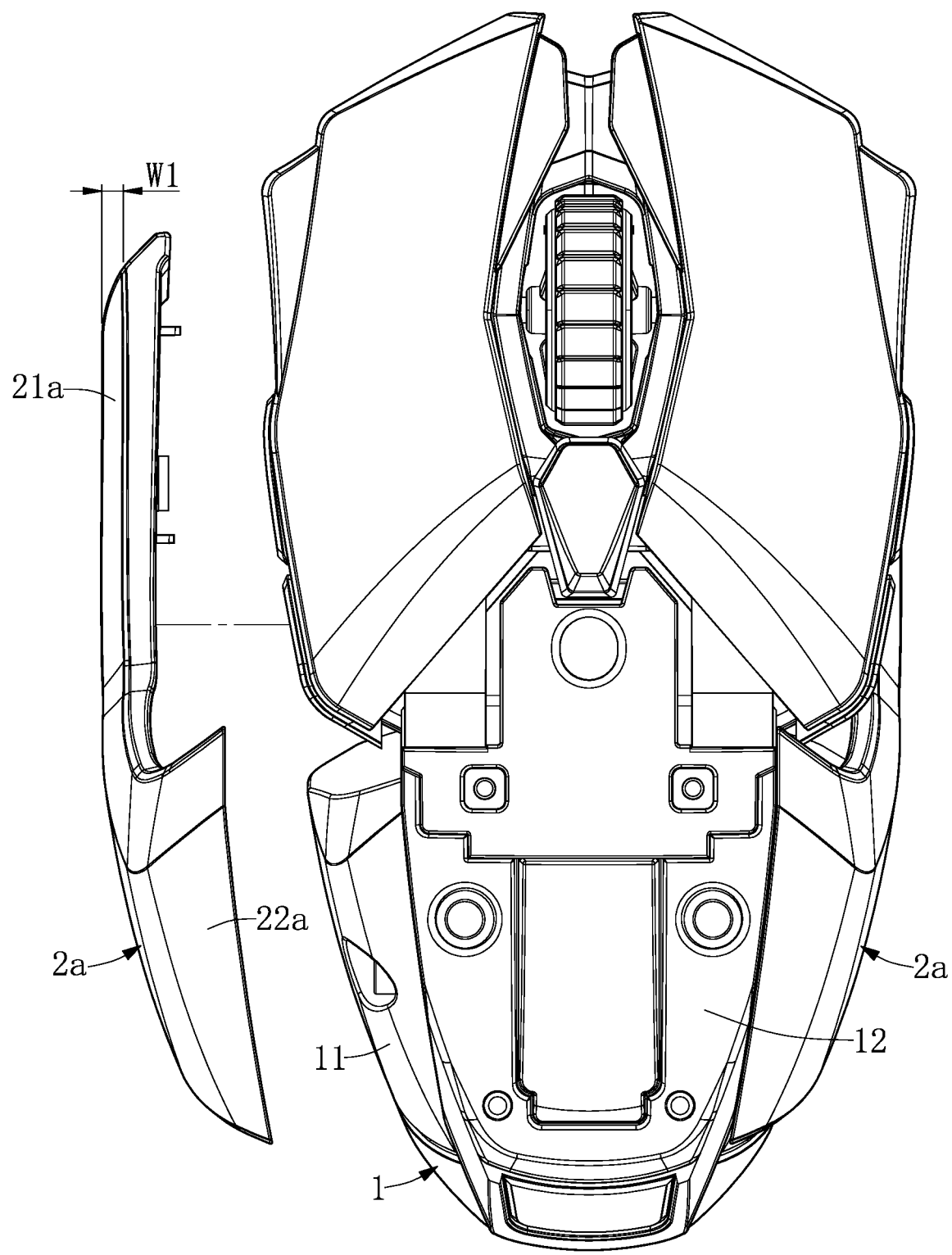
FIG. 5 is a schematic top view of the mouse having the replaceable palm rest and the replaceable finger rest during placement of the replaceable finger rest according to the present disclosure.

As shown in FIG. 5, the replaceable finger rest 2a is coupled to the side portions 11 of the mouse body 1. In addition, the replaceable finger rest 2a has a finger rest portion 21a that protrudes outwardly for placement of a finger and a coupling portion 22a that bends and extends from the finger rest portion 21a toward the rear side portion 12 of the mouse body 1. When the user uses the mouse, the finger can rest on the finger rest portion 21a. A width of the finger rest portion 21a extending outwardly is defined as a first width W1.

Figure 6:
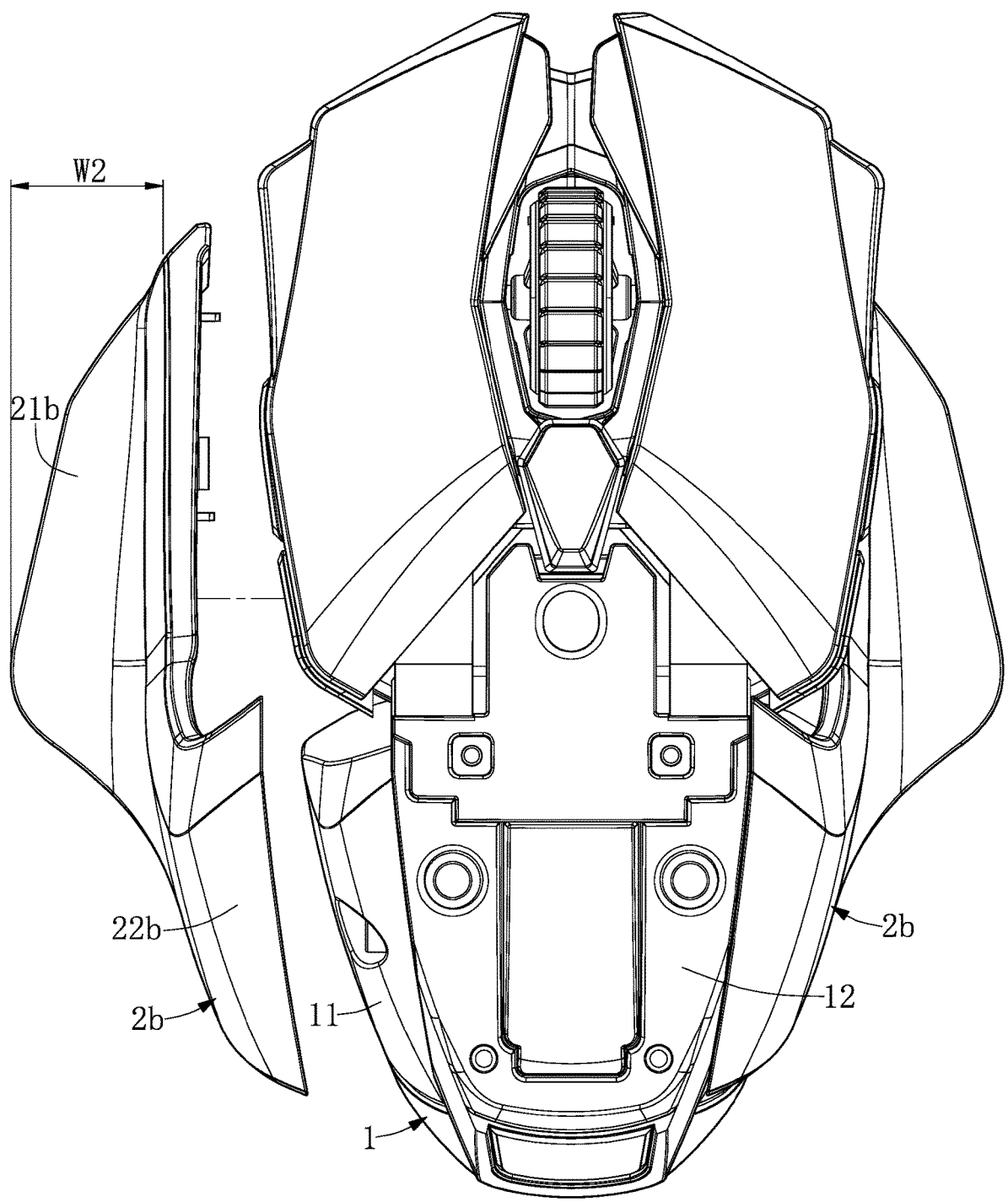
FIG. 6 is a schematic top view of the mouse having the replaceable palm rest and the replaceable finger rest during placement of a different replaceable finger rest according to the present disclosure.

As shown in FIG. 6, the replaceable finger rest 2b is coupled to the side portions 11 of the mouse body 1. In addition, the replaceable finger rest 2b has a finger rest portion 21b that protrudes outwardly for placement of the finger and a coupling portion 22b that bends and extends from the finger rest portion 21b toward the rear side portion 12 of the mouse body 1. When the user uses the mouse, the finger can rest on the finger rest portion 21b. A width of the finger rest portion 21b extending outwardly is defined as a second width W2. The second width W2 is greater than the first width W1 shown in FIG. 5. Therefore, by replacing the finger rest, the width of the finger rest extending outwardly can be changed. Accordingly, the user can choose to move the mouse while keeping the finger in partial contact with a table surface or not in contact with the table surface at all.

Figure 7:
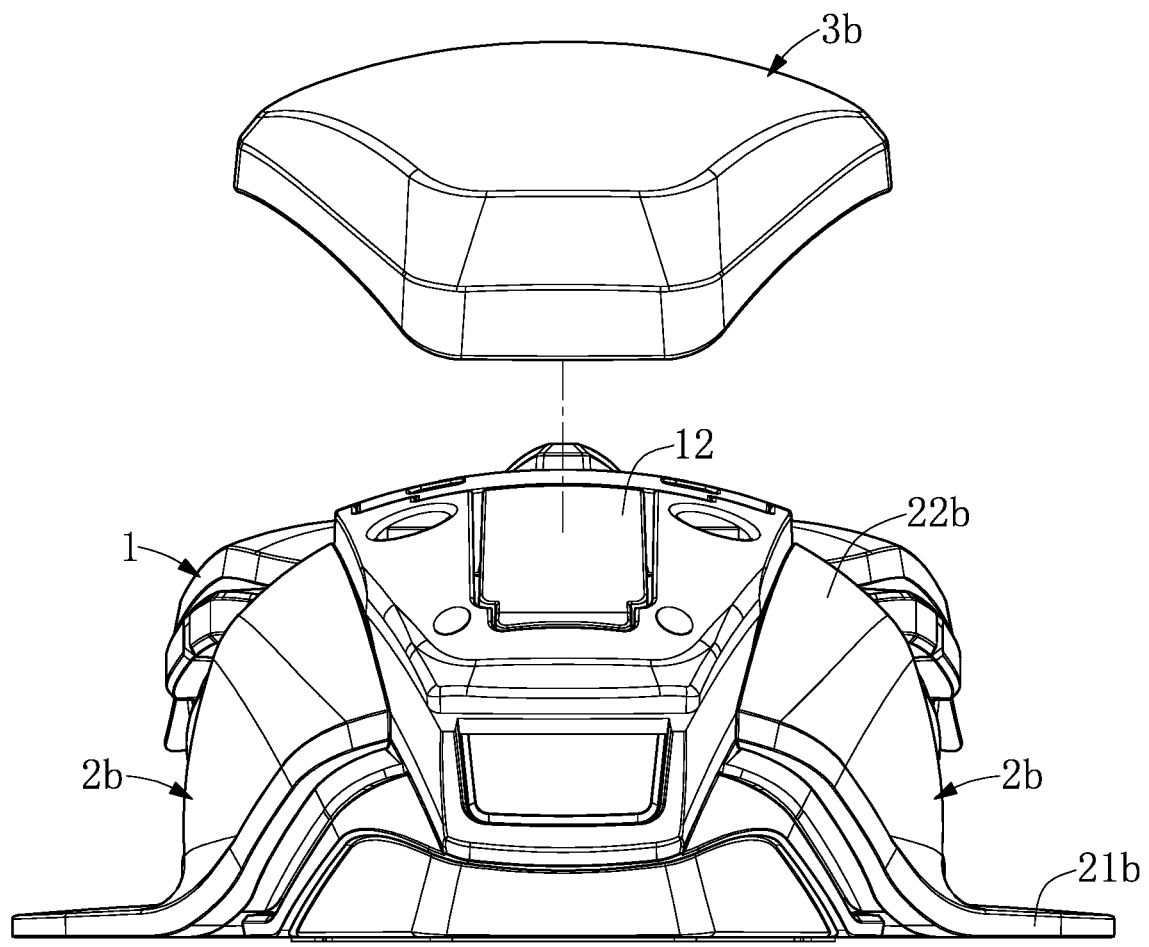
FIG. 7 is a schematic rear view of the mouse having the replaceable palm rest and the replaceable finger rest during placement of the replaceable palm rest according to the present disclosure.
Figure 8:
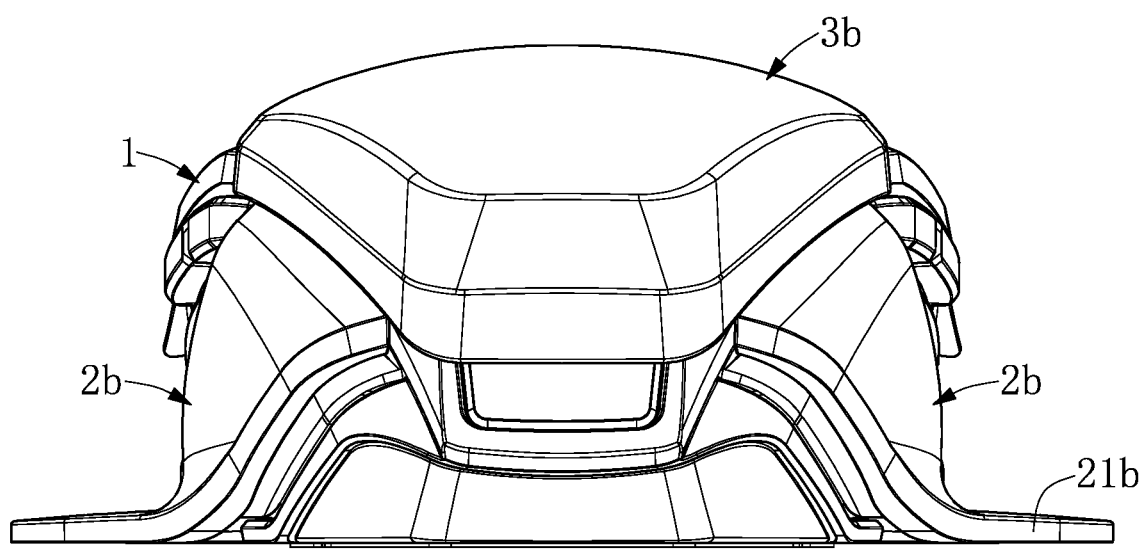
FIG. 8 is a schematic rear view of the replaceable palm rest being placed on the mouse having the replaceable palm rest and the replaceable finger rest according to the present disclosure.

It is worth mentioning that, as shown in FIG. 7 and FIG. 8, the replaceable palm rest 3b of the present embodiment presses downwardly against the coupling portion 22b of the replaceable finger rest 2b when the replaceable palm rest 3b of the present embodiment is downwardly coupled to the rear side portion 12 of the mouse body 1. That is to say, through the replaceable finger rest 2b being coupled to the side portions 11 of the mouse body 1 by magnetic attraction, the replaceable palm rest 3b can then be coupled to the rear side portion 12 of the mouse body 1 by magnetic attraction and press downwardly against the coupling portion 22b of the replaceable finger rest 2b. Therefore, in the present disclosure, not only can the finger rest and the palm rest be replaced in a convenient and rapid manner by magnetic attraction, but the issue regarding the finger rest not being capable of achieving a firm coupling by magnetic attraction alone can also be effectively resolved.

Furthermore, in the present embodiment, a quantity of the replaceable finger rest 2b is two. Depending on personal requirements of the user (e.g., left-handedness or right-handedness), at least one of the replaceable finger rests 2b is coupled to at least one of the side portions 11 of the mouse body 1.

In conclusion, in the mouse having the replaceable palm rest and the replaceable finger rest provided by the present disclosure, by virtue of "the replaceable finger rest 2a, 2b being replaceably coupled to the side portions 11 of the mouse body 1 by magnetic attraction, the replaceable palm rest 3a, 3b being replaceably coupled to the rear side portion 12 of the mouse body 1 by magnetic attraction, and the replaceable palm rest 3a, 3b pressing downwardly against the replaceable finger rest 2a, 2b when the replaceable palm rest 3a, 3b is downwardly coupled to the rear side portion 12 of the mouse body 1", not only can the finger rest and the palm rest be replaced in a convenient and rapid manner by magnetic attraction, but the issue regarding the finger rest not being capable of achieving a firm coupling by magnetic attraction alone can also be effectively resolved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse, comprising:
   a mouse body having two side portions opposite to each other and a rear side portion located between the two side portions;
   a replaceable finger rest replaceably coupled to one of the side portions of the mouse body by magnetic attraction; and
   a replaceable palm rest replaceably coupled to the rear side portion of the mouse body by magnetic attraction, wherein the replaceable finger rest has a finger rest portion that protrudes outwardly for placement of a finger, and a coupling portion that bends and extends from the finger rest portion toward the rear side portion of the mouse body, and the replaceable palm rest presses downwardly against the coupling portion of the replaceable finger rest when the replaceable palm rest is downwardly coupled to the rear side portion of the mouse body by magnetic attraction.

2. The mouse according to claim 1, wherein the rear side portion of the mouse body is configured to include a plurality of first magnetic attraction members, and the replaceable palm rest is configured to include a plurality of second magnetic attraction members; wherein, when the replaceable palm rest is coupled to the rear side portion of the mouse body, the plurality of first magnetic attraction members are correspondingly and magnetically attached to the plurality of second magnetic attraction members.

3. The mouse according to claim 2, wherein the rear side portion of the mouse body is configured to include two of the first magnetic attraction members, and the two of the first magnetic attraction members are located at opposite left and right sides of the rear side portion of the mouse body, respectively; wherein the replaceable palm rest is configured to include two of the second magnetic attraction members, and the two of the second magnetic attraction members are located at opposite left and right sides of a bottom side of the replaceable palm rest, respectively.

4. The mouse according to claim 1, wherein each of the side portions of the mouse body is configured to include a plurality of third magnetic attraction members, and the replaceable finger rest is configured to include a plurality of fourth magnetic attraction members; wherein, when the replaceable finger rest is coupled to the side portions of the mouse body, the plurality of third magnetic attraction members are correspondingly and magnetically attached to the plurality of fourth magnetic attraction members.

5. The mouse according to claim 4, wherein each of the side portions of the mouse body is configured to include two of the third magnetic attraction members, and the two of the third magnetic attraction members are located at opposite front and rear sides of each of the side portions of the mouse body, respectively; wherein the replaceable finger rest is configured to include two of the fourth magnetic attraction members, and the two of the fourth magnetic attraction members are located at opposite front and rear sides of an inner side of the replaceable finger rest, respectively.

6. The mouse according to claim 1, wherein a height between a rear edge of a top surface of the replaceable palm rest and a bottom side of the mouse body is changed by replacement of the replaceable palm rest.

7. The mouse according to claim 1, wherein a width of the finger rest portion of the replaceable finger rest extending outwardly is changed by replacement of the replaceable finger rest.

* * * * *